United States Patent
Shrivastava et al.

(10) Patent No.: US 11,802,044 B2
(45) Date of Patent: *Oct. 31, 2023

(54) PROCESS FOR PRODUCING PURE HYDROGEN WITH LOW STEAM EXPORT

(71) Applicant: L'Air Liquide, Société Anonyme pour l'Etude et l'Exploitation des Procédés Georges Claude, Paris (FR)

(72) Inventors: Swatantra Kumar Shrivastava, Lich (DE); Dieter Ulber, Steinbach (DE); Mirko Huebel, Frankfurt am Main (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,467

(22) Filed: Sep. 23, 2021

(65) Prior Publication Data
US 2022/0089437 A1 Mar. 24, 2022

(30) Foreign Application Priority Data

Sep. 23, 2020 (EP) ..................................... 20020426

(51) Int. Cl.
 *C01B 3/38* (2006.01)
 *B01D 53/047* (2006.01)
 (Continued)

(52) U.S. Cl.
 CPC ............ *C01B 3/388* (2013.01); *B01D 53/047* (2013.01); *B01D 53/1475* (2013.01); *B01J 8/062* (2013.01);
 (Continued)

(58) Field of Classification Search
 CPC ........... C01B 3/388; C01B 3/382; C01B 3/52; C01B 2203/0233; C01B 2203/065;
 (Continued)

(56) References Cited

U.S. PATENT DOCUMENTS

2012/0114533 A1* 5/2012 Crouch .................... B01J 8/062
   422/240
2012/0157731 A1   6/2012 Grover
   (Continued)

FOREIGN PATENT DOCUMENTS

EP   2 103 568   9/2009
EP   2 103 569   9/2009
   (Continued)

OTHER PUBLICATIONS

Ullmann's Encyclopedia of Industrial Chemistry, B. Elvers, S. Hawkins, M. Ravenscroft, J.F. Rounsaville, G. Schulz, eds., 6$^{th}$ (1998) edition, 77-82, 357-380, 399-407.
(Continued)

*Primary Examiner* — Steven J Bos
*Assistant Examiner* — Syed T Iqbal
(74) *Attorney, Agent, or Firm* — Elwood L. Haynes

(57) ABSTRACT

A process is proposed for producing pure hydrogen by steam reforming of a feed gas comprising hydrocarbons, preferably natural gas or naphtha, with a simultaneously low and preferably adjustable export steam flow rate. The process includes the steam reforming of the feed gas, for which the heat of reaction required is provided by combustion of one or more fuel gases with combustion air in a multitude of burners arranged within the reformer furnace. According to the invention, the combustion air, before being introduced into the burners, is heated by means of at least one heat exchanger in indirect heat exchange with the hot flue gas to temperatures of at least 530° C.

15 Claims, 2 Drawing Sheets

(51) Int. Cl.
*B01D 53/14* (2006.01)
*B01J 8/06* (2006.01)
*C01B 3/52* (2006.01)

(52) U.S. Cl.
CPC ............ *C01B 3/382* (2013.01); *C01B 3/52* (2013.01); *B01D 2252/2021* (2013.01); *B01D 2252/2026* (2013.01); *B01D 2252/20426* (2013.01); *B01D 2252/20431* (2013.01); *B01D 2252/20468* (2013.01); *B01D 2256/16* (2013.01); *B01D 2257/504* (2013.01); *B01J 2208/00495* (2013.01); *B01J 2208/00504* (2013.01); *C01B 2203/0233* (2013.01); *C01B 2203/065* (2013.01); *C01B 2203/0816* (2013.01); *C01B 2203/0827* (2013.01); *C01B 2203/0833* (2013.01); *C01B 2203/148* (2013.01); *C01B 2203/1614* (2013.01)

(58) Field of Classification Search
CPC .... C01B 2203/0816; C01B 2203/0827; C01B 2203/0833; C01B 2203/148; C01B 2203/1614; C01B 3/384; C01B 2203/0283; C01B 2203/0415; C01B 2203/043; C01B 2203/046; C01B 2203/0475; C01B 2203/0883; C01B 2203/0894; C01B 2203/1235; C01B 2203/1241; C01B 2203/127; C01B 2203/1294; C01B 2203/142; C01B 3/48; C01B 3/38; C01B 2203/042; C01B 2203/0485; C01B 2203/1264; C01B 2203/169; B01D 53/047; B01D 53/1475; B01D 2252/2021; B01D 2252/2026; B01D 2252/20426; B01D 2252/20431; B01D 2252/20468; B01D 2256/16; B01D 2257/504; B01D 2252/20478; B01D 53/1493; B01J 8/062; B01J 2208/00495; B01J 2208/00504; B01J 8/0285; Y02C 20/40; Y02P 20/129; Y02P 20/151

See application file for complete search history.

(56) References Cited

U.S. PATENT DOCUMENTS

| | | | |
|---|---|---|---|
| 2012/0256132 A1* | 10/2012 | Polster | C01B 3/384 252/373 |
| 2012/0282145 A1* | 11/2012 | Pham | C01B 3/384 422/162 |
| 2015/0076410 A1 | 3/2015 | Schlichting et al. | |
| 2016/0068391 A1* | 3/2016 | Wolf | C01B 3/382 252/373 |
| 2017/0044013 A1* | 2/2017 | Kelly | B01J 7/02 |

FOREIGN PATENT DOCUMENTS

| | | |
|---|---|---|
| EP | 2 512 981 | 6/2014 |
| EP | 2 776 365 | 10/2018 |

OTHER PUBLICATIONS

European Search Report for corresponding EP 20020426.1, dated Mar. 3, 2021.

* cited by examiner

PROCESS FOR PRODUCING PURE HYDROGEN WITH LOW STEAM EXPORT

CROSS REFERENCE TO RELATED APPLICATIONS

This application claims priority to EP 20020426.1, filed Sep. 23, 2020, the entire contents of which are incorporated herein by reference.

BACKGROUND

Field of the Invention

The invention relates to a process for producing pure hydrogen by steam reforming a feed gas comprising hydrocarbons, preferably natural gas or naphtha, with a simultaneously low and preferably adjustable flow rate of export steam which is obtained as secondary product in the steam reforming of hydrocarbons.

Prior Art

Hydrocarbons may be catalytically reacted with steam to afford synthesis gas, i.e. mixtures of hydrogen ($H_2$) and carbon monoxide (CO). As is explained in Ullmann's Encyclopedia of Industrial Chemistry, Sixth Edition, 1998 Electronic Release and 6th edition 2003, keyword "Gas Production", steam reforming is the most commonly employed method of producing synthesis gas which may then be converted to further important commodity chemicals such as methanol or ammonia. While different hydrocarbons, such as for example naphtha, liquid gas or refinery gases may be converted, it is steam reforming of methane-containing natural gas (steam methane reforming, SMR) that dominates. This is highly endothermic. It is therefore performed in a reformer furnace in which numerous catalyst-containing reformer tubes in which the steam reforming reaction takes place are arranged in parallel. The outer walls of the reformer furnace and its ceiling and floor are faced or lined with a plurality of layers of refractory material which withstands temperatures of up to 1200° C. The reformer tubes are usually fired with burners which are mounted on the top or bottom or on the side walls of the reformer furnace and directly fire the interspace between the reformer tubes. The fuel employed is a portion of the feed gas and/or by-product streams containing flammable components obtained during product workup. Heat transfer to the reformer tubes is affected by thermal radiation and convective heat transfer from the hot flue gases obtained during combustion in the burners.

After pre-heating by heat exchangers or fired heaters to about 500° C., the hydrocarbon-steam mixture enters the reformer tubes after final heating to about 500° C. to 800° C. and is converted therein to carbon monoxide and hydrogen over the reforming catalyst. Common catalysts are nickel-based reformer catalysts which are introduced into the reformer tubes as a bed of shaped bodies for example. While higher hydrocarbons are converted fully to carbon monoxide and hydrogen, partial conversion is typical in the case of methane. The composition of the product gas is determined by the reaction equilibrium; the product gas thus comprises not only carbon monoxide and hydrogen but also carbon dioxide, unconverted methane and water vapour.

For energy optimization and/or in the case of feedstocks comprising higher hydrocarbons, the above-described reforming process, also referred to synonymously hereinafter as main reforming, may have what is called a prereformer for precracking of the feedstock arranged upstream thereof. Prereforming is usually to be understood as meaning the use of a low temperature reforming step arranged upstream of a conventional main reformer operated with natural gas, for example a steam reformer. By comparison with the steam reforming reaction, the reaction equilibrium is established at much lower temperatures in the prereforming. The main feature of the prereforming is the conversion of the higher hydrocarbons in the feed mixture to methane and partly to synthesis gas constituents. A reactor type often used for the prereforming is a simple adiabatically operated shaft reactor filled with special prereforming catalyst which thus differs markedly also in terms of its construction from the allothermically operated main reformer comprising a multiplicity of reformer tubes.

Since virtually all higher hydrocarbons present in the natural gas used as feed are converted to methane and synthesis gas constituents in the prereformer, the risk of forming coke deposits in the main reformer is markedly reduced. This makes it possible to reduce the steam/carbon ratio (S/C) and increase the thermal loading of the reformer tubes, thus resulting in an altogether reduced energy consumption and a reduction in size of the employed apparatuses.

The prereforming stage usually also has a desulfurizing stage arranged upstream of it to remove sulfur proportions in the feedstock that act as a catalyst poison for the catalysts present in the downstream reformers. The desulfurization may be carried out on a purely adsorptive basis, for example over adsorbents based on zinc oxide. For some applications preference is given to hydrogenating desulfurization (hydrodesulfurization), wherein the sulfur bound in organic and inorganic sulfur components is in the presence of suitable catalysts liberated in the form of hydrogen sulfide using hydrogen and subsequently bound to adsorbents of the above-described type. The recited desulfurization methods are therefore often employed in combination.

Before introduction into the reformer tubes filled with reformer catalyst which are arranged in the reformer furnace of the main reformer and heated with burners, the optionally desulfurized and prereformed feed gas is brought to the steam reforming entry temperature. This employs a feed gas superheater which is configured as a multistage heat exchanger, wherein the heat exchanger stages are located in the waste heat section for the burner flue gas of the reformer furnace, for example in the form of so-called coils.

The hot synthesis gas product gas is partially cooled in indirect heat exchange against cold media in one or more heat exchangers after leaving the reformer furnace. It is possible here to obtain, inter glia, streams of steam of different quality from aqueous condensates or pure water, for example boiler feed water.

The partly cooled crude synthesis gas then undergoes further conditioning steps dependent on the type of the desired product or of the downstream process. If the emphasis is on the production of pure hydrogen, these typically include a CO conversion plant for reaction of carbon monoxide in the crude synthesis gas with steam to give further hydrogen and carbon dioxide (also referred to as CO shift or water-gas shift (WGS) plant), a carbon dioxide removal apparatus, for example by gas scrubbing with cryogenic methanol by the Rectisol process, and finally an apparatus for pressure swing adsorption (PSA) that gives pure hydrogen as the end product.

Steam reforming plants thus efficiently produce not only the main synthesis gas product or its constituents, for example pure hydrogen, but also a product steam stream consisting under some circumstances of multiple steam substreams as a by-product, which is released wholly or partly as export steam to external consumers. The consumers of the main product here are often not identical to the acceptors of the export steam, or can accept only small amounts thereof. Discrepancies can thus occur between synthesis gas production and the acceptance of the export steam since the production rates of the two products, synthesis gas and product steam, are coupled to one another, and the production rate of the export steam in the conventional steam reforming process can be adjusted only to a very minor degree. Secondly, especially in the case of part-load operation of the steam reformer, it is under some circumstances not possible to deliver the volume of export steam agreed with external consumers. Moreover, it may be desirable to temporarily lower the volume of export steam to be released if, for example, shutdowns in operation or part-load operation occur in acceptor facilities.

In the case of primary or exclusive production of pure hydrogen by steam reforming, for comparative purposes, the ratio of export steam produced to hydrogen produced is often reported in kg of steam per standard cubic metre of hydrogen.

The prior art therefore already describes processes for steam reforming of methane in which attempts were made to achieve decoupling of export steam production from synthesis gas production. For instance, European patent application EP 2103568 A2 describes a process for steam reforming of methane, in which virtually no export steam is released to external consumers. This is achieved in that, firstly, virtually all the steam produced is consumed in the reforming process itself, Secondly, one way in which steam production is minimized is in that the fuel is burnt in the reformer furnace by means of oxygen-enriched air, which reduces the mass flow of hot combustion offgases available for indirect heat exchange with water/steam streams. It is also proposed that the amount of heat transferred in indirect heat exchange against hot synthesis gas product gas or hot combustion offgases be used for the superheating of a steam stream that is subsequently utilized for energy generation in a steam turbine. The energy recovered here can then be used in turn for oxygen production or oxygen enrichment of the combustion air. A disadvantage here is the complex plant concept.

A similar approach for minimization of steam export is followed in patent publication EP 2103569 A2. As well as the largely complete consumption of the steam produced within the reformer, the synthesis gas product gas, after cooling, is sent to a pressure swing adsorption in which carbon dioxide is removed. The resultant hydrogen-enriched product gas from the pressure swing adsorption that thus has an elevated calorific value is partly returned to the reformer furnace and used as fuel therein. This is disadvantageous since the high-value hydrogen product produced in a complex manner is merely utilized thermally by combustion.

European patent specification EP 2512981 B1 describes a process for steam reforming of a hydrocarbonaceous feed. In this case, a portion of the flue gas is branched off after leaving the waste heat section of the reformer furnace and before entering the flue gas disposal, and recycled to the reformer furnace. By variation of the proportion of the recycled flue gas, it is possible to vary the amount of export steam released to external consumers within a wide range. In this way, it is possible to keep the amount of export steam constant even in part-load operation of the reformer. Alternatively, in the case of full-load operation of the reformer, it is possible to lower or further increase the amount of export steam by corresponding alteration of the mass flow rate of flue gas recycled.

In spite of the described approaches from the prior art, there is still a need for a process for steam reforming of hydrocarbons directed to the production of pure hydrogen that simultaneously enables production of a low and preferably adjustable flow rate of export steam. It is not always desirable or technically possible, for example, to recycle flue gases.

SUMMARY

It is therefore an object of the present invention to specify such a process. This object is achieved, in a first aspect, by a process having the features of claim 1. Further embodiments of the invention are evident from the pending process claims.

Prereforming conditions, steam reforming conditions and CO conversion conditions are known to those skilled in the art from the prior art, for example the documents discussed at the outset. These are the physicochemical conditions under which a measurable conversion, preferably one of industrial relevance, of higher hydrocarbons to lower hydrocarbons is achieved, in particular methane (prereforming) or hydrocarbons to synthesis gas products (steam reforming or main reforming), or of carbon monoxide with steam to give carbon dioxide and hydrogen (CO conversion, CO shift).

In the case of steam reforming conditions, important parameters for this purpose include the establishment of a suitable steam reforming entry temperature of typically about 1000° C. and addition of steam to the feed gas containing hydrocarbons and thus adjustment of a steam/carbon ratio (S/C ratio). Typical values for the S/C ratio are between 1.5 and 3.5 mol/mol. Necessary adjustments of these conditions to the respective operational requirements will be made by those skilled in the art on the basis of routine experiments. Any specific reaction conditions disclosed may serve here as a guide, but they should not be regarded as limiting in relation to the scope of the invention.

The statement that the reformer tubes do not comprise any heat recovery apparatus, especially any internal heat exchanger, should be understood to mean that the feed gas or product gas flows through the reformer tubes in straight pass and then is discharged from them without any deflection of the gas flow and any introduction into a heat exchanger disposed within the reformer tube or directly on the reformer tube, i.e. with establishment of physical contact, with the aid of which heat is transferred to the gas flow entering the reformer tube by indirect heat exchange, as proposed, for example, in patent specification EP 2776365 B1.

The indication that a material stream is directly supplied to a specific process stage or a specific plant part is to be understood as meaning that the material stream is introduced to this process stage or this plant part without previously having been passed through other process stages or plant parts with the exception of purely transportational operations and the means required therefor, for example pipelines, valves, pumps, compressors, reservoirs.

All pressures are reported in absolute pressure units, bara for short, or in gauge pressure units, barg for short, unless otherwise stated in the particular individual context.

For the purposes of the present invention, a fluid connection between two regions of the apparatus of the invention is any type of connection which makes it possible for a fluid, for example a gas stream, to be able to flow from the one region to the other of the two regions, regardless of any regions or components located in between. In particular, a direct fluid connection is to be understood as meaning any type of connection which makes it possible for a fluid, for example a gas stream, to flow directly from one to the other of the two regions, with no further regions or components being interposed, with the exception of purely transportational operations and the means required for this purpose, for example pipelines, valves, pumps, compressors, reservoirs. One example would be a pipeline leading directly from one to the other of the two regions.

For the purposes of the present invention, a means is something which makes it possible to achieve, or is helpful in achieving, an objective. In particular, means for carrying out a particular process step are all physical objects which a person skilled in the art would take into consideration in order to be able to carry out this process step. For example, a person skilled in the art will consider means of introducing or discharging a material stream to include any transporting and conveying apparatuses, i.e. for example pipelines, pumps, compressors, valves, which seem necessary or sensible to said skilled person for performance of this process step on the basis of such a person's knowledge of the art.

For the purposes of this description steam is to be understood as being synonymous with water vapour unless the opposite is indicated in an individual case. By contrast, the term "water" refers to water in the liquid state of matter unless otherwise stated in an individual case.

Heat exchange relationship is to be understood as meaning the possibility of heat exchange or heat transfer between two regions of the apparatus according to the invention for example, wherein any mechanisms of heat exchange or heat transfer such as heat conduction, heat radiation or convective heat transport may come into effect. An indirect heat exchange relationship is especially to be understood as meaning the type of heat exchange or heat transfer which is carried out through a wall (so-called heat transit) which comprises the stages of heat transfer from fluid to the surface of the wall, heat conduction through the wall and heat transfer from the surface of the wall to fluid 2.

A further purification, conditioning or processing step of the raw synthesis gas is to be understood as meaning any measure or process step known from the prior art for producing a pure synthesis gas, pure hydrogen and/or pure carbon monoxide. These include CO conversion for increasing the hydrogen proportion in the synthesis gas, separation of carbon dioxide by means of a suitable scrubbing process such as for example the Rectisol process or scrubbing with amine-containing scrubbing media, cryogenic gas fractionation for producing pure carbon monoxide, pressure swing adsorption (PSA) for producing pure hydrogen and physical process steps such as for example cooling, condensing and separating the condensate.

For heating of the reformer tubes in the reformer furnace, apart from recycled combustible by-product streams from the steam reforming plant, it is also possible to burn a proportion of the feed gas as fuel gas in the burners for generation of heat. This proportion of what is called the trim gas corresponds to the calorific value contribution of the feed gas based on the overall calorific value of the fuel gas. It also corresponds to the proportion of the flow rate of the feed gas based on the total volume flow rate of the fuel gas, corrected by the respective calorific values.

The invention is based on the finding that, in a steam reforming process, a portion of the enthalpy of the hot flue gases can be utilized for preheating of the combustion air to higher temperatures than known from the prior art, rather than utilizing this proportion of the enthalpy for production of additional pure steam from boiler feed water in a waste heat tank, which can then be released to external consumers as export steam. For this purpose, an appropriate heat exchanger tube winding (called heat exchanger coil) is introduced into the flue gas pathway of the reformer furnace. In this way, the firing performance of the burners can be reduced, leaving the rest of the heat budget of the steam reforming plant unaffected, and still providing, for example, sufficient amounts of enthalpy for preheating of the other feed streams for the steam reforming process, for example the feed gas containing hydrocarbons.

In the context of the invention, the presence of a prereforming stage (prereformer) and the interaction thereof with the other parts of the plant or process steps is particularly advantageous and has a favourable effect in two ways on the intended reduction in the volume of export steam: Firstly, the preliminary cracking of the feed gas containing hydrocarbons in an external prereforming stage upstream of the steam reforming plant reduces the load on the steam reforming plant as the main reforming stage; consequently, it is possible to operate the burners therein at lower load/power. Secondly, the preheating of the feed gas introduced into the prereforming stage is in turn brought about via indirect heat exchange with the hot flue gases from the reformer furnace, for which a dedicated heat exchanger coil is again provided. Both aspects bring about a reduction in the enthalpy of the hot flue gases, such that less pure steam has to be produced as export steam in order to remove this enthalpy to the desired degree and hence reduce it.

A second aspect of the process according to the invention is characterized in that the prereformer comprises two prereforming stages, where the individual stages of the prereformer are configured as shaft reactors filled with a solid catalyst active for the prereforming. As a result of the two-stage preliminary cracking or prereforming of the feed gas, there is an even greater degree than in the case of one-stage prereforming of displacement of the steamcracking to the prereforming stage, and hence a reduction in the load on the main reforming stage on the one hand and removal of enthalpy from the hot flue gases from the reformer furnace on the other hand. This makes it possible, for a fixed ratio of export steam produced to hydrogen produced, to set lower steam-to-carbon ratios in the feed gas mixture for the steam reforming than in the case of a purely one-stage prereformer. On the other hand, for a given steam-to-carbon ratio, it is possible to further reduce the ratio of export steam produced to hydrogen produced. A third aspect of the process according to the invention is characterized in that the reformer tubes are arranged in rows in the reformer furnace, and in that the burners are disposed between the rows of reformer tubes and/or between the outer rows of reformer tubes and the inner walls of the reformer furnace, where the burners are aligned such that the longitudinal axis of at least some of the burner flames runs parallel to the longitudinal axis of the reformer tubes. This achieves a particularly favourable transfer of heat from the burner flames to the reformer tubes, since the distance of the burner flames from the surrounding reformer tubes and the length of the respective radiation zones is optimized.

A fourth aspect of the process according to the invention is characterized in that the reformer tubes do not comprise any heat recovery apparatus, especially any internal heat exchangers, and the prereformed feed gas flows through in straight pass. Especially in the case of steam reforming processes that use such conventional reformer tubes, the product gases and burner flue gases have a high enthalpy content that is typically utilized in the form of production of large volumes of export steam. Therefore, the invention enables particularly effective reduction in the volume of export steam.

A fifth aspect of the process according to the invention is characterized in that the hydrogen production plant comprises a desulfurization stage.

A sixth aspect of the process according to the invention is characterized in that the hydrogen purification plant comprises at least one apparatus selected from the following group:
  carbon dioxide removal apparatus
  apparatus for cryogenic gas fractionation
  apparatus for pressure swing adsorption (PSA)

The apparatuses mentioned and the processes implemented thereby have been found to be effective in the workup of crude synthesis gas to give pure gases.

A seventh aspect of the process according to the invention is characterized in that the carbon dioxide removal apparatus is configured as a scrubbing operation wherein at least one scrubbing agent selected from the following group is used: methanol, N-methylpyrrolidone (NMP), secondary amines, preferably diethanolamine, tertiary amines, preferably methyldiethanolamine, polyethylene glycol dialkyl ethers, preferably polyethylene glycol dimethyl ether. Especially after a CO conversion stage that further increases the carbon dioxide content in the synthesis gas, effective removal of carbon dioxide is required since this would disrupt the further workup of the synthesis gas to give pure hydrogen.

An eighth aspect of the process according to the invention is characterized in that the hydrogen purification plant comprises an apparatus for pressure swing adsorption, and in that at least one combustible offgas stream is discharged from the apparatus for pressure swing adsorption and is added at least partly to the fuel gas. In this way, it is possible to sensibly utilize the enthalpy content of this by-product stream.

A ninth aspect of the process according to the invention is characterized in that the crude gas temperature is between 800 and 950° C., preferably between 830 and 900° C., most preferably between 840 and 890° C. Studies have shown that, within these ranges of values for the crude gas temperature, particularly effective lowering of the volume of export steam is possible by the invention.

A tenth aspect of the process according to the invention is characterized in that the overall SIC ratio is between 2.2 and 3.7, preferably between 2.5 and 3.5. Studies have shown that, within these ranges of values for the overall SIC ratio, particularly effective lowering of the volume of export steam is possible by the invention.

An eleventh aspect of the process according to the invention is characterized in that the fuel gas has a trim gas content, where the trim gas content constitutes the calorific value contribution of the feed gas based on the overall calorific value of the fuel gas and where the trim gas content is between greater than zero and 20%, preferably between 1% and 16%. Studies have shown that, within these ranges of values for the trim gas content, particularly effective lowering of the volume of export steam is possible by the invention.

A twelfth aspect of the process according to the invention is characterized in that the ratio of export steam produced to hydrogen produced is between 0 and 1 kg of steam per standard cubic metre of hydrogen, preferably between 0 and 0.4 kg of steam per standard cubic metre of hydrogen, most preferably between 0 and 0.2 kg of steam per standard cubic metre of hydrogen. The volumes of export steam mentioned can usually be released to external consumers without difficulty, or no export steam at all is produced in one example. The other process parameters are therefore chosen so as to result in these volumes of export steam.

A thirteenth aspect of the process according to the invention is characterized in that, based on the flow direction of the flue gas stream, the at least one heat exchanger for heating the combustion air in the flue gas waste heat section of the reformer furnace is disposed upstream of the position of a further heat exchanger provided for the superheating of steam, and preferably also upstream of the position of a further heat exchanger provided for the preheating of the feed gas. Optimization calculations by means of process simulation have shown that a particularly favourable pinch point for configuration of the thermal integration of the overall process is obtained in this way. In addition, it is possible to make the heat exchange area of the corresponding heat exchanger coil particularly small.

A fourteenth aspect of the process according to the invention is characterized in that the conduit for the heated combustion air between the heat exchanger and the burners has refractory facing or lining, using at least one thermal insulation material selected from the following group: refractory stone, refractory casting compound or ramming compound, mineral fibre mats, self-supporting mineral fibre mouldings. In addition, a metallic inner tube may be provided for guiding of the heated combustion air, which is surrounded by the thermal insulation material, in order in this way to protect the thermal insulation material from mechanical stresses at high flow rates.

A fifteenth aspect of the process according to the invention is characterized in that the conduit for the heated combustion air between the heat exchanger and the burners is configured such that the flow rate of the heated combustion air is at least 30 m/s, preferably at least 50 m/s. In this way, the insulated conduit for the heated combustion air can be made particularly inexpensive, since smaller conduit cross sections can be used, and there is likewise a reduction in the technical complexity for the required pipeline support structure owing to the lower weight. At these high flow rates, it is additionally particularly favourable to provide a metallic inner tube for guiding of the heated combustion air, which is surrounded by the thermal insulation material, in order in this way to protect the thermal insulation material from mechanical stresses at high flow rates.

A sixteenth aspect of the process according to the invention is characterized in that the at least one heat exchanger for heating of the combustion air is equipped with a regulatable bypass. In this way, it is possible to keep the volume of export steam constant over wide ranges of the hydrogen production capacity of the process, typically 40% to 100% of the nominal hydrogen production capacity. This is advantageous especially in part-load operation of the process and on startup and shutdown thereof.

A seventeenth aspect of the process according to the invention is characterized in that, in part-load operation of the hydrogen production plant, the crude gas temperature is lowered relative to that in full-load operation and the overall S/C ratio in part-load operation of the hydrogen production plant is increased compared to that in full-load operation such that the absolute amount of export steam in part-load operation remains constant compared to that in full-load operation. This aspect brings further advantages with regard to the release of a constant volume of export steam to external consumers in part-load operation of the process. It is particularly favourable here to choose the preheating temperature of the combustion air such that it is close to the upper limit of the numerical ranges mentioned, for example between 700 and 790° C., preferably between 710 and 760° C., most preferably between 750 and 755° C. Particularly great advantages can additionally be achieved in the case of combination of this aspect with the sixteenth aspect of the process according to the invention, according to which the at least one heat exchanger for heating of the combustion air is equipped with a regulatable bypass.

A further aspect of the process according to the invention is characterized in that the entire process condensate is recycled into the steam reforming process without restrictions. The process condensate which is obtained by the generally multistage cooling of the crude synthesis gas is guided here within a separate process steam system. The export steam system here is fully separated from the process condensate and process steam system, such that it is possible to produce export steam of the highest quality that is suitable for condensation-type steam turbines. At low ratios of export steam to pure hydrogen, more enthalpy is available for complete evaporation of the process condensate that would otherwise have to be discharged from the process as liquid waste stream and disposed of in the case of incomplete evaporation.

A further aspect of the process according to the invention is characterized in that an advantageous combination with CO conversion processes that require less steam input than conventional CO conversion processes is possible. An example of this that may be given is the moderate-temperature CO conversion (MT shift) compared to the high-temperature CO conversion (HT shift). The combination of the process according to the invention with a CO conversion process having lower steam input additionally improves the energy efficiency of the overall process. A further improvement in the energy efficiency of the overall process is additionally obtained when the prereformer is configured in two stages, since the two-stage preliminary cracking or prereforming of the feed gas enables lower steam-to-carbon ratios in the feed gas mixture than in the case of a merely one-stage prereformer. The ratio of export steam produced to hydrogen produced can be reduced to zero with this configuration.

A further aspect of the process according to the invention is characterized in that, in addition, a technology for reducing the content of nitrogen oxides ($NO_x$) in the burner flue gas is used, since higher air preheating temperatures increase the nitrogen oxide formation. It is possible to use standard apparatuses and processes for reducing $NO_x$ levels, for example ultra-low-$NO_x$ burners, and catalytic (SCR) or noncatalytic (SNCR) reduction of $NO_x$ by injection of corresponding reducing agents such as ammonia or urea.

BRIEF DESCRIPTION OF THE DRAWINGS

Developments, advantages and possible applications of the invention are also apparent from the following description of working and numerical examples and the drawings. All features described and/or depicted form, either in themselves or in any combination, the invention, regardless of the way they are combined in the claims or the back-references therein.

DETAILED DESCRIPTION OF PREFERRED EMBODIMENTS

Figure 1:
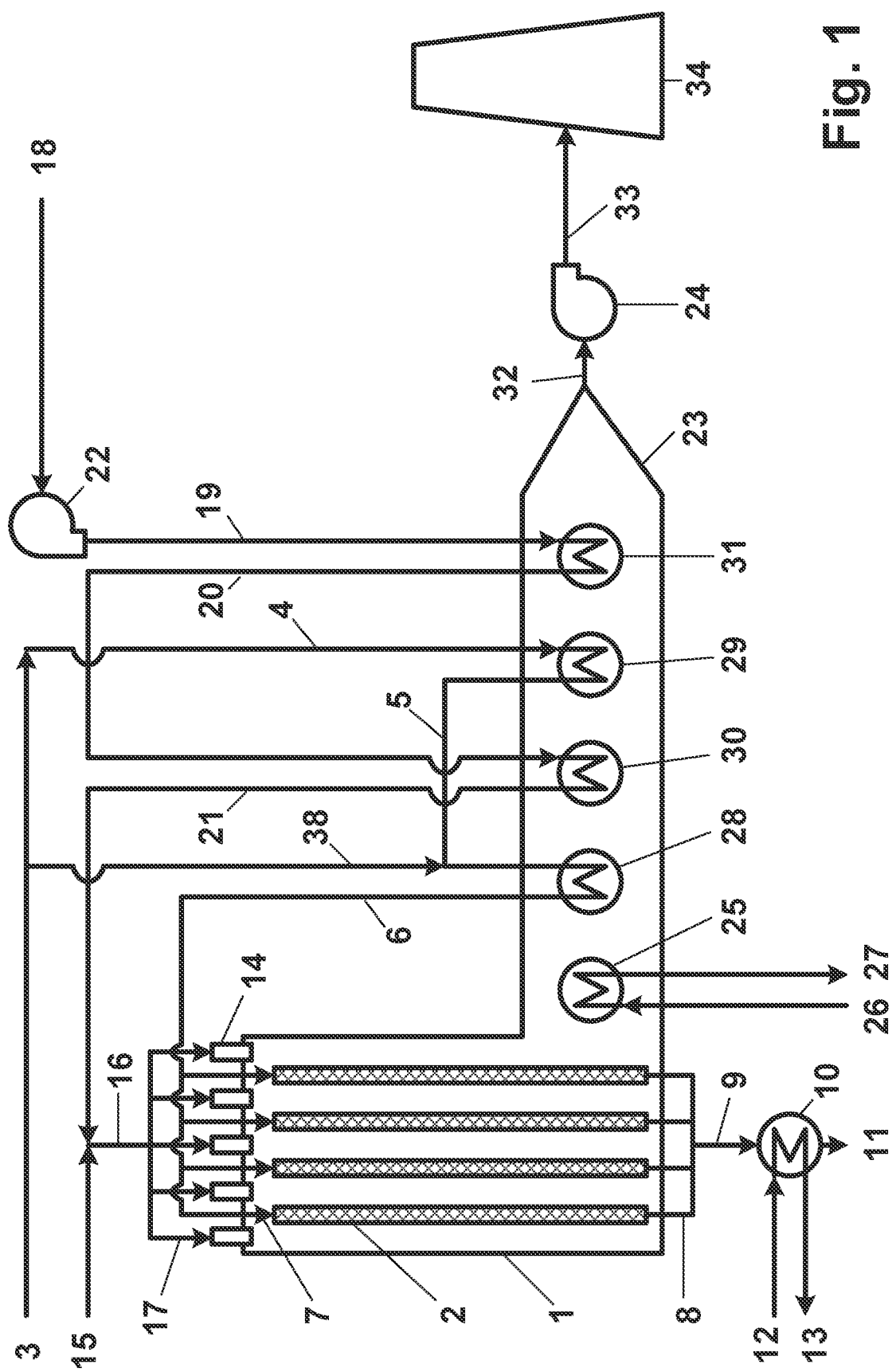
FIG. 1 is an example of the reformer furnace and of the flue gas waste heat section in a process for producing pure hydrogen by steam reforming according to the prior art.

FIG. 1 shows an example of a process/a plant for producing synthesis gas by steam reforming according to the prior art. A reformer furnace 1 of a main reforming stage contains a multiplicity of catalyst-filled reformer tubes 2, wherein for the sake of clarity FIG. 1 shows only four reformer tubes. The catalyst used therein is a nickel-based commercially available steam reforming catalyst. Via conduits 3, 4, 5, 6, 7 and 38, the reformer tubes are charged with preheated hydrocarbonaceous natural gas as reformer feed gas that has been desulfurized in a desulfurization stage beforehand and preformed in a two-stage prereformer (neither shown pictorially in FIG. 1 and FIG. 2). The inlet temperature of the desulfurized and prereformed reformer feed gas into the reformer tubes is, for example, 500° C.

In addition, steam is added to the reformer feed before it enters the reformer (not shown in FIG. 1), such that there is a defined steam/carbon ratio (S/C ratio) of between 2.2 and 3.7, preferably between 2.5 and 3.5, and of 3 mol/mol in one example. Since steam has already been added to the feed gas in the prereformer, for example separately in each prereformer stage, the steam/carbon ratio is usually reported as the overall S/C ratio that accordingly relates to the total amount of steam added to the feed gas.

After conversion of the feed gas in the reformer tubes, the gaseous crude synthesis gas as reformer product containing hydrogen, CO and unconverted natural gas constituents is withdrawn via conduits 8 and collection conduit 9 and cooled in a heat exchanger 10 to obtain a cooled reformer product and drawn off via conduit 11 and sent to at least one further purifying, conditioning or processing step (not shown pictorially). In the case of production of pure hydrogen from the crude synthesis gas, the further purification, conditioning or processing steps often comprise the conversion of CO to increase the hydrogen content of the synthesis gas and a usually multistage hydrogen purification plant, wherein the hydrogen purification plant comprises at least one of the following apparatuses: carbon dioxide removal apparatus, apparatus for cryogenic gas fractionation, apparatus for pressure swing adsorption (PSA). The process conditions to be employed for the purpose are known per se to the person skilled in the art. The operation of the hydrogen purification plant or the apparatuses present therein, especially the apparatus for pressure swing adsorption, affords one or more combustible gas streams as by-products that are at least partly recycled to a multitude of burners 14 in the reformer furnace, where they are incinerated to generate heat. For heating of the reformer tubes in the reformer furnace, a portion of the feed gas is usually additionally also incinerated as fuel gas in the burners 14 to generate heat (not shown pictorially). This proportion of what is called the trim gas corresponds to the calorific value contribution of the feed gas based on the overall calorific value of the fuel gas. It also corresponds to the proportion of the flow rate of the feed gas based on the total volume flow rate of the fuel gas, corrected by the respective calorific values.

The crude synthesis gas discharged from the reformer furnace is cooled down by way of example in indirect heat exchange against a water stream supplied via conduit 12 from which, by evaporation in a heat exchanger 10, a steam stream is obtained, which is discharged via conduit 13. The water stream may comprise fresh water or boiler feed water or aqueous process condensate which is obtained in the further cooling of the crude synthesis gas.

The reformer tubes are fired using the multitude of burners 14 that are mounted at the top end of the reformer furnace and fire the interspace between the reformer tubes. Preferably, the reformer tubes are arranged in rows in the reformer furnace, and the burners are disposed between the rows of reformer tubes and/or between the outer rows of reformer tubes and the inner walls of the reformer furnace, where the burners are aligned such that the longitudinal axis of at least some of the burner flames runs parallel to the longitudinal axis of the reformer tubes.

For the sake of clarity the figure shows only five burners. In the present example the burners 14 are operated with a mixture of recycled PSA offgas and natural gas feed gas as combustion gas, which is supplied to the burners via conduits 15, 16 and distributing conduits 17. The combustion air is supplied via conduits 18, 19, 20 and 21, preheated using heat exchangers 30, 31 and admixed with the fuel in conduit 16. A fan 22 is used for conveying the combustion air.

In reformer furnace 1, heat is transferred to the reformer tubes by thermal radiation and convective heat transfer from the hot flue gases. Once heat transfer is complete the flue gases enter a waste heat section 23 of the reformer furnace 1, The flue gases are conveyed through the waste heat section of the reformer furnace in the extraction draught of a fan 24 connected to the waste heat section via a conduit 32.

The waste heat section of the reformer furnace further cools the flue gases via a plurality of heat exchangers in the flue gas pathway, with utilization of the enthalpy of the flue gases for producing one or more further vapour streams and for multistage preheating of the reformer feed and the combustion air. According to the prior art, the combustion air is preheated here to temperatures of, for example, less than 530° C.

With regard to the generation of steam, FIG. 1 shows, by way of example, a heat exchanger 25 as the first heat exchanger in flow direction in the flue gas pathway, in which the hot flue gases are cooled in indirect heat exchange against a hydrogen stream introduced via conduit 26, generating a vapour stream which is discharged via conduit 27 and is sent to the further utilization or to export to external consumers. The cooling of the flue gases in heat exchanger 25 may alternatively be effected against a steam stream, in which case superheated steam is then withdrawn via conduit 27.

After passing through the heat exchangers 28 to 31 used for preheating the reformer feed and the combustion air, the cooled flue gases exit the waste heat section of the reformer furnace via conduit 32 and by means of the fan 24 are sent via conduit 33 to a flue gas disposal 34.

Figure 2:
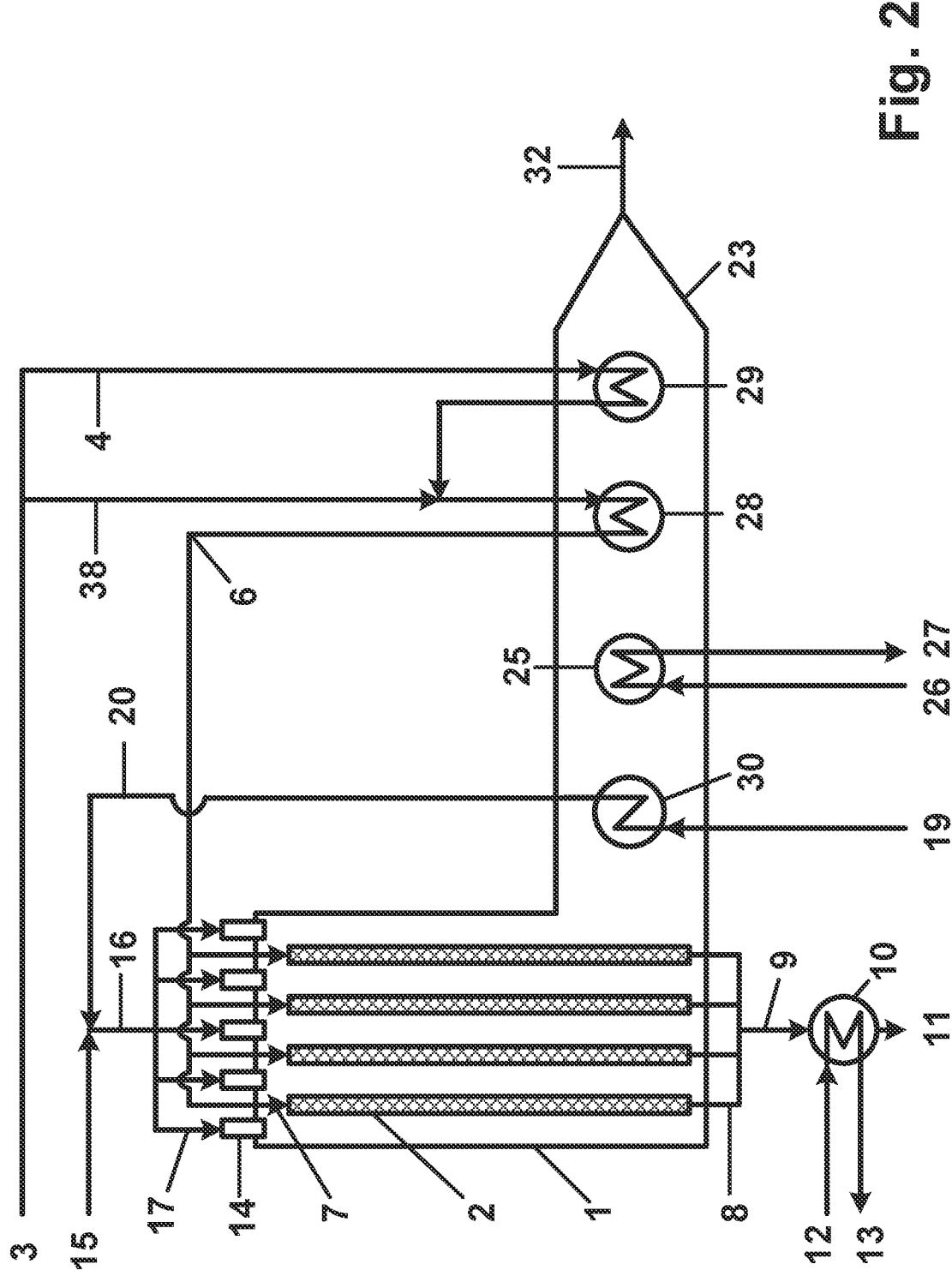
FIG. 2 is an example of the reformer furnace and of the flue gas waste heat section in a process for producing pure hydrogen by steam reforming according to the invention.

FIG. 2 shows an example of the reformer furnace and of the flue gas waste heat section in a process for producing pure hydrogen by steam reforming according to the invention. Identical reference numerals correspond here to identical structural process and apparatus elements, unless mentioned otherwise in the individual case. Not shown for reasons of simplification in FIG. 2, but nevertheless present in the example, are the conduit 18 and the fan 22 for the feeding of combustion air and the apparatus elements downstream of conduit 32 for discharge and disposal of the flue gas from the waste heat section 23. Likewise not shown, but nevertheless present in the example, are all apparatus elements that were discussed in connection with FIG. 1 but not shown pictorially therein.

The combustion air is now preheated, in the example of FIG. 2, by a heat exchanger 30 which is supplied with combustion air from the environment via a conduit 19. The heat exchanger 30, in the example shown, is upstream of the positions of the further heat exchangers in the flue gas waste heat section. Optimization calculations by means of process simulation have shown that a particularly favourable pinch point for configuration of the thermal integration of the overall process is obtained in this way. In addition, it is possible to make the heat exchange area of the corresponding heat exchanger coils particularly small. The combustion air is heated up by means of heat exchanger 30 in indirect heat exchange with the hot flue gas to a temperature between 530 and 790° C., preferably between 540 and 760° C., most preferably between 550 and 755° C., and then supplied via conduits 20, 16 and 17 to the burners 14 of the reformer furnace.

The heat exchanger 30, in one example, may also comprise multiple individual heat exchangers, all of which are disposed in the flue gas waste heat section of the reformer furnace and serve to heat up the combustion air in indirect heat exchange with the hot flue gas. In one example, at least one of the individual heat exchangers is upstream of the positions of the further heat exchangers in the flue gas waste heat section, and in one example upstream of the positions of all other heat exchangers in the flue gas waste heat section.

Numerical Example

A steam reforming plant was operated with preheating temperatures of the combustion air of 515° C. (prior art, comparative example, Comp.) and 750° C. (invention, Inv.). The obtained ratios of export steam produced to hydrogen produced and other important operating parameters are compiled in the tables that follow for three sets of different operating parameters. In one example, the hydrocarbon feed was preformed in a two-stage preformer rather than a one-stage preformer, with an inlet temperature in the second preformer stage of 650° C.

In all inventive examples, it was possible to reduce the ratio of export steam produced to hydrogen produced to zero. This was possible especially in the example with a two-stage preformer, even though the crude gas temperature and the overall S/C ratio were kept constant.

LIST OF REFERENCE SYMBOLS

[1] Reformer furnace
[2] Reformer tubes
[3]-[9] Conduit
[10] Heat exchanger
[11]-[13] Conduit
[14] Burner
[15]-[21] Conduit
[22] Fan
[23] Waste heat section
[24] Fan
[25] Heat exchanger
[26] Conduit
[27] Conduit
[28] Heat exchanger
[29] Heat exchanger
[30] Heat exchanger
[31] Heat exchanger
[32] Conduit
[33] Conduit
[34] Flue gas disposal
[38] Conduit

| Parameters | Comp. | Inv. |
|---|---|---|
| Steam export/H2, kg/m3 (STP) (1) | 0.4 | 0.2 |
| Crude gas temperature, ° C. | 872 | 900 |
| Overall S/C ratio | 2.9 | 2.5 |
| Number of prereformer stages | 1 | 1 |
| Air preheating temperature, ° C. | 515 | 750 |
| Proportion of trim gas, % (2) | 15 | 4 |
| Steam export/H2, kg/m3 (STP) (1) | 0.2 | 0.0 |
| Crude gas temperature, ° C. | 847 | 867 |
| Overall S/C ratio | 3.4 | 3.3 |
| Number of prereformer stages | 1 | 1 |
| Air preheating temperature, ° C. | 515 | 750 |
| Proportion of trim gas, % (2) | 13 | 12 |
| Steam export/H2, kg/m3 (STP) (1) | 0.3 | 0.0 |
| Crude gas temperature, ° C. | 885 | 885 |
| Overall S/C ratio | 3.1 | 3.1 |
| Number of prereformer stages (3) | 2 | 2 |
| Air preheating temperature, ° C. | 515 | 750 |
| Proportion of trim gas, % (2) | 25 | 15 |

Elucidations
(1) steam export (kg/h)/hydrogen production (m3 (STP)/h)
(2) % fuel gas calorific value or burner output in the reformer furnace via trim gas (hydrocarbon feed gas). Residual calorific value or residual burner output via recycled PSA offgas.
(3) net temperature of the second prereformer stage: 650° C.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for producing a pure hydrogen product gas by steam reforming of a feed gas containing hydrocarbons, comprising:
   (a) providing the feed gas comprising hydrocarbons,
   (b) providing a hydrogen production plant comprising
      (b1) a prereformer,
      (b2) a steam reforming plant with a reformer furnace, comprising
         (b21) a multitude of reformer tubes filled with steam reforming catalyst, wherein the reformer tubes have a feed gas inlet for a feed gas mixture on a first side of the reformer furnace and a product gas outlet for a crude synthesis gas on a second side of the reformer furnace, wherein the second side is opposite the first side, and further comprising
         (b22) a multitude of burners,
      (b3) a CO conversion plant,
      (b4) a hydrogen purification plant,
   (c) adding steam to the feed gas to obtain a steam-feed gas mixture having an overall S/C ratio,
   (d) introducing the steam-feed gas mixture into the prereformer, preforming the steam-feed gas mixture under prereforming conditions to give a prereformed feed gas comprising hydrogen, carbon oxides, methane and higher hydrocarbons, discharging the prereformed feed gas,
   (e) introducing the prereformed feed gas into the feed gas inlet of the reformer tubes of the steam reforming plant, heating the reformer tubes by means of the burners, wherein the burners are operated with a fuel gas containing a proportion of the feed gas as trim gas and a proportion of a recycled combustible offgas stream, and with combustion air, wherein the operation of the burners produces a hot flue gas,
   (f) steam reforming the prereformed feed gas under steam reforming conditions to give a crude synthesis gas comprising hydrogen, carbon oxides and unconverted hydrocarbons and having a crude gas temperature, discharging the crude synthesis gas from the product gas outlet of the reformer tubes,
   (g) introducing the crude synthesis gas into the CO conversion plant, performing the CO conversion under CO conversion conditions, discharging a converted crude synthesis gas having elevated hydrogen content relative to the crude synthesis gas,
   (h) introducing the converted crude synthesis gas into the hydrogen purification plant, discharging a pure hydrogen product gas and at least one combustible offgas stream, wherein
   (i) the combustion air prior to introduction into the burners is heated up by means of at least one heat exchanger in indirect heat exchange with the hot flue gas to a temperature between 530 and 790° C.,
   further comprising a steam superheating heat exchanger, wherein, the flue gas stream flow has a direction and based on the flue gas stream flow direction, the at least one heat exchanger for heating the combustion air is disposed upstream of the position of the steam superheating heat exchanger.

2. The process according to claim 1, wherein the reformer furnace comprises inner walls, wherein the reformer tubes are arranged in rows in the reformer furnace, comprising outer rows, and in that the burners are disposed between the rows of reformer tubes and/or between the outer rows of reformer tubes and the inner walls of the reformer furnace, where the burners are aligned such that the longitudinal axis of at least some of the burner flames runs parallel to the longitudinal axis of the reformer tubes.

3. The process according to claim 1, wherein the reformer tubes do not comprise any heat recovery apparatus, and the preformed feed gas flows through in straight pass.

4. The process according to claim 1, wherein the hydrogen production plant comprises a desulfurization stage.

5. The process according to claim 1, wherein the hydrogen purification plant comprises at least one apparatus selected from the following group:
   carbon dioxide removal apparatus
   apparatus for cryogenic gas fractionation
   apparatus for pressure swing adsorption (PSA).

6. The process according to claim 5, wherein the carbon dioxide removal apparatus is configured as a gas scrubbing operation wherein at least one scrubbing agent selected from the following group is used:
   methanol, N-methylpyrrolidone (NMP), secondary amines, tertiary amines, polyethylene glycol dialkyl ethers.

7. The process according to claim 1, wherein the hydrogen purification plant comprises an apparatus for pressure swing adsorption, and in that at least one combustible offgas stream is discharged from the apparatus for pressure swing adsorption and is added at least partly to the fuel gas.

8. The process according claim 1, wherein the crude gas temperature is between 800 and 950° C.

9. The process according to claim 1, wherein the overall S/C ratio is between 2.2 and 3.7.

10. The process according to claim 1, wherein the fuel gas has a trim gas content, where the trim gas content constitutes the calorific value contribution of the feed gas based on the overall calorific value of the fuel gas and where the trim gas content is between greater than zero and 20%.

11. The process according to claim 1, wherein a ratio of export steam produced to hydrogen produced is between 0 and 1 kg of steam per standard cubic metre of hydrogen.

12. The process according to claim 1, wherein a conduit for the heated combustion air between the heat exchanger and the burners has refractory facing or lining, using at least one thermal insulation material selected from the following group: refractory stone, refractory casting compound or ramming compound, mineral fibre mats, self-supporting mineral fibre mouldings.

13. The process according to claim 1, wherein a conduit for the heated combustion air between the heat exchanger and the burners is configured such that the flow rate of the heated combustion air is at least 30 m/s.

14. The process according to claim 1, wherein the at least one heat exchanger for heating of the combustion air is equipped with a regulatable bypass.

15. The process according to claim 1, wherein, in part-load operation of the hydrogen production plant, the crude gas temperature is lowered relative to that in full-load operation and the overall S/C ratio in part-load operation of the hydrogen production plant is increased compared to that in full-load operation such that an absolute amount of export steam in part-load operation remains constant compared to that in full-load operation.

* * * * *